Nov. 3, 1936.  N. A. JUNG  2,059,242
TALLY WINDING SPOOL FOR TYPEWRITING, COMPUTING, AND LIKE MACHINES
Filed June 11, 1935  2 Sheets—Sheet 1
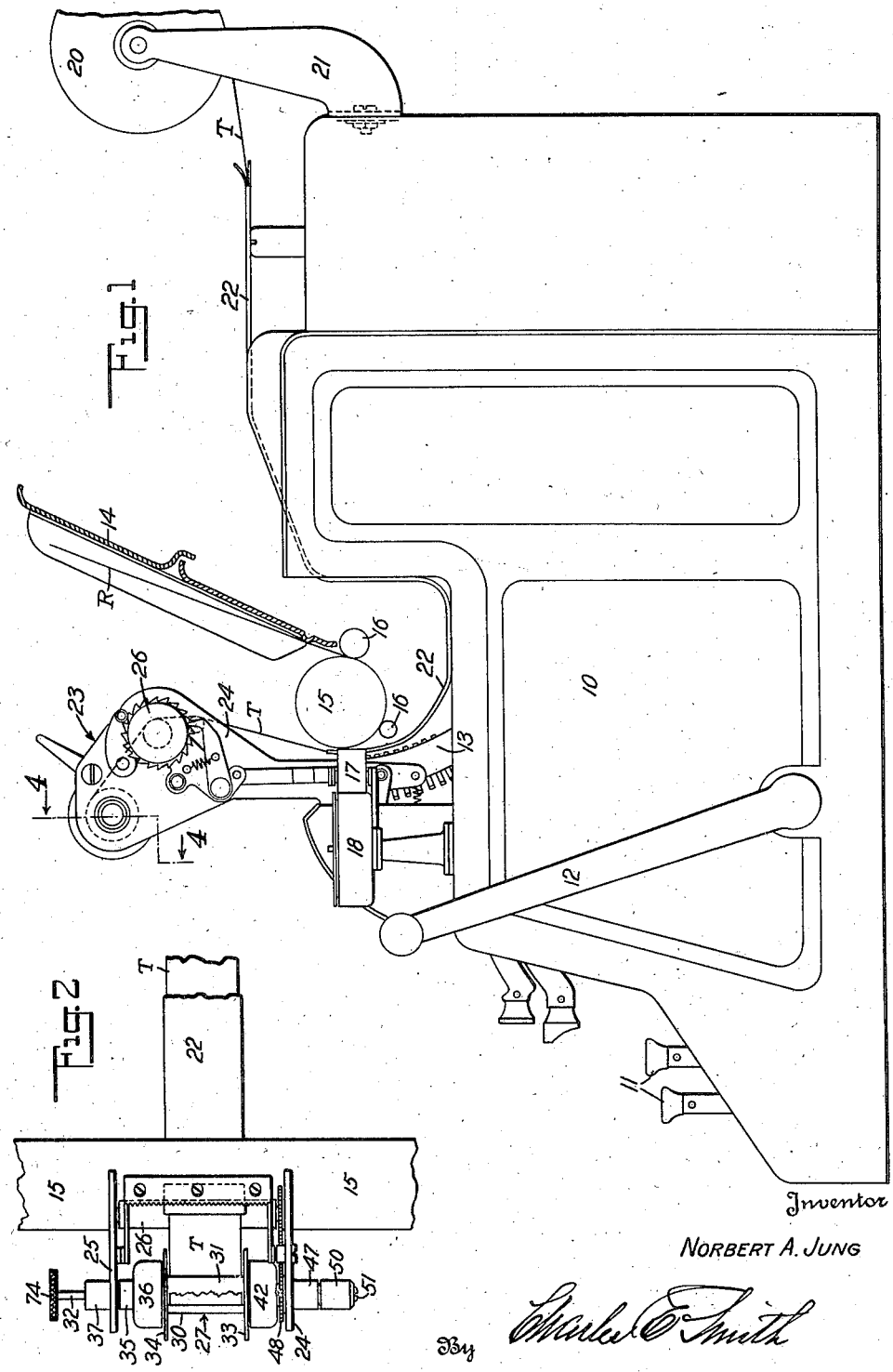
Inventor
NORBERT A. JUNG
By Charles E. Smith
Attorney Nov. 3, 1936.   N. A. JUNG   2,059,242
TALLY WINDING SPOOL FOR TYPEWRITING, COMPUTING, AND LIKE MACHINES
Filed June 11, 1935   2 Sheets-Sheet 2
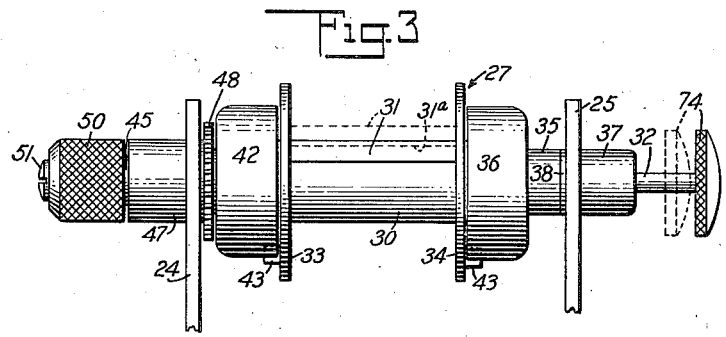
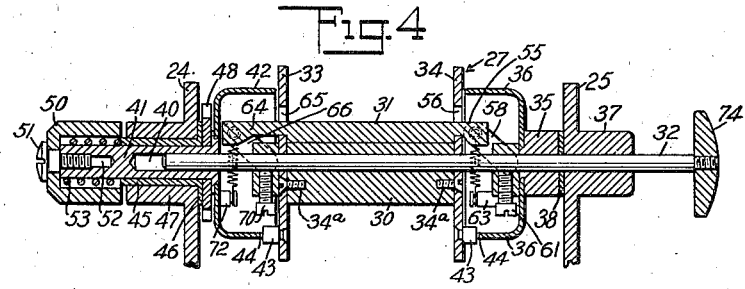
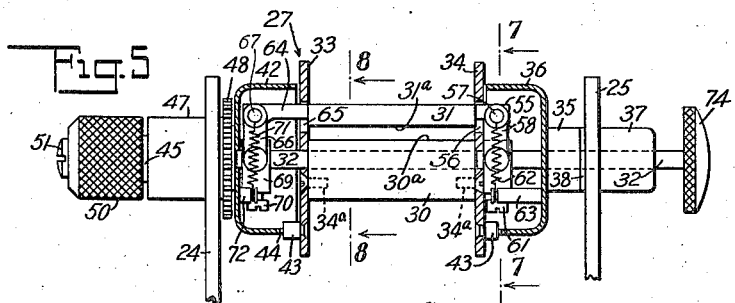
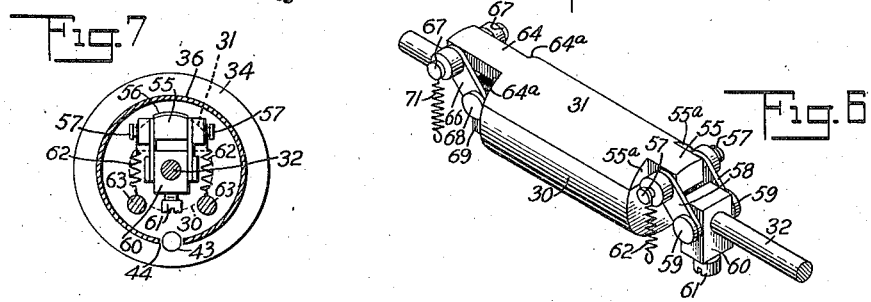
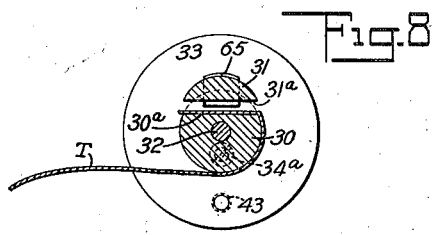
Inventor
NORBERT A. JUNG
By Charles O. Smith
Attorney

UNITED STATES PATENT OFFICE 2,059,242

TALLY WINDING SPOOL FOR TYPEWRITING, COMPUTING, AND LIKE MACHINES

Norbert A. Jung, Cincinnati, Ohio, assignor to Remington Rand Inc., New York, N. Y., a corporation of Delaware Application June 11, 1935, Serial No. 26,063

10 Claims. (Cl. 242—74)

My invention relates to tally roll mechanism for use on computing, tabulating, typewriting and like machines.

One of the primary objects of my invention, generally stated, is to provide an improved tally strip rewind spool including novel means for clamping a tally strip thereto.

Another object of my invention is to provide a tally strip rewind spool having a smooth cylindrical core made up of two sections, one of which is movable to open and clamping positions, so that the tally strip may be clamped between said two sections.

A further object of my invention is to provide, in a rewind spool of the character referred to, novel means for opening and clamping the movable section of the core which includes two sets of parallel links connected to said movable section and a push-rod for opening and closing said sectional core.

To the above and other ends which will hereinafter appear, my invention consists in the features of construction, arrangements of parts and combinations of devices set forth in the following description and particularly pointed out in the appended claims.

In the accompanying drawings, wherein like reference characters indicate corresponding parts in the different views, Fig. 1 is a right side elevational view, with certain parts omitted, of a computing machine equipped with the devices of my invention;

Fig. 2 is a fragmentary plan view of part of the mechanism shown in Fig. 1;

Fig. 3 is a front elevational view of a tally strip rewind spool constructed in accordance with my invention;

Fig. 4 is a longitudinal, sectional view of said spool, the section being taken substantially along the line 4—4 of Fig. 1 and looking in the direction of the arrows at said line;

Fig. 5 is a front elevational view, partly in section, of the spool and showing the movable section of the core thereof in open position;

Fig. 6 is a detail isometric view of the sectional core of the spool and showing certain of the releasing devices therefor;

Fig. 7 is a vertical, transverse sectional view of the spool taken along the line 7—7 of Fig. 5 and looking in the direction of the arrows at said line; and Fig. 8 is a vertical, transverse sectional view of the spool taken along the line 8—8 of Fig. 5 and looking in the direction of the arrows at said line.

I have shown my invention, in the present instance, embodied in a computing machine known as the Dalton "Multiplex commercial ledger posting and statement machine", Model 490 Z—131Z, which is equipped with an automatic tally roll rewind and feed device of the type shown in the application of Arthur W. Feiertag filed June 11, 1935, and bearing Serial Number 26,047, only so much of said computing machine and rewind and feed device being shown as is necessary to arrive at an understanding of my invention and its embodiment therein. Although my invention may be readily incorporated in said machine without modifying, or materially modifying the existing structural features thereof, it should be understood that the invention is not restricted to its use in said machine alone but may be included in various forms of computing, typewriting and like machines generally, wherever found available.

The Dalton machine, as is well known, is a computing machine of the ten key type in which most of the computing mechanism is housed within a casing 10. A keyboard is mounted at the front of the machine and includes a set of numeral keys 11, by means of which amounts may be set up in the usual pin carriage (not shown). Upon an actuation of the usual operating handle 12 said amounts will be entered into the computing mechanism and simultaneously printed on a record sheet R by means of a set of printing instrumentalities 13. The record sheet R may be supported by the usual paper table 14 and fed around a platen 15 with the aid of feed rollers 16 to the printing line position and behind the usual inked ribbon 17 which is fed from one to another of a pair of ribbon spools 18 mounted on the frame of the machine in the usual manner. The platen 15 is rotatably supported in the end plates of a carriage (not shown) which is fitted for traveling movement from side to side of the machine under the control of feeding devices and tabulator mechanism of regular construction.

As mentioned above, the Dalton machine in which my invention has been embodied is equipped with tally roll mechanism of the type disclosed in the Feiertag application Serial No. 26,047 by means of which a duplicate printing of every item entered upon the record sheet R may be obtained without the use of any interposed carbon sheet or auxiliary ribbon. Briefly, this mechanism comprises a supply roll 20, of tissue tally strip T, supported at the rear of the machine by means of brackets 21 and from which said tally strip T is fed over the rear of the machine and beneath the carriage, with the aid of a closed chute 22, to the printing line position in front of the ink ribbon 17. An automatic feed and rewind device, designated as a whole by the reference numeral 23, is mounted at the front of the machine on the stationary frame work and comprises left and right-hand side or supporting plates 24 and 25 (Fig. 3) between which is mounted a feed roll mechanism 26. The feed roll mechanism 26 is adapted to impart a line spacing movement to the tally strip T upon each actuation of the operating handle 12 as fully explained in the above referred to Feiertag application.

Upon being fed from the feeding mechanism 26 the tissue tally strip T may be wound upon a rewind spool, designated as a whole by the reference numeral 27, which is automatically driven from said feeding mechanism 26 in a manner that will hereinafter more clearly appear. In practice it has been found that, when using a thin transparent or tissue tally strip, difficulty is often encountered in readily and effectively securing one end of said tally strip to the rewind spool so that it may be wound uniformly thereon and easily removed therefrom without tearing the strip. Hence, in accordance with my present invention I aim to provide a novel rewind spool including simple and efficient means for clamping the tally strip thereto.

I shall now describe a rewind spool which is constructed in accordance with my invention.

It is to be understood that in the following description and claims when I use the terms "stationary" and "movable" or their equivalents, I mean to imply that the parts are "stationary" or "movable" with respect to the general spool structure since obviously the tally strip rewind spool will be rotated on its axis in order to wind the tally strip T thereon.

Referring particularly to Figs. 3–8, it will be seen that the rewind spool 27 comprises a sectional cylindrical core including a lower fixed or stationary section 30 having a clamping face 30ᵃ and an upper section 31 having a clamping face 31ᵃ. The section 31 is movable into and out of clamping engagement with said lower section by means of an actuating, releasing or push-rod 32 upon which said lower section 30 is loosely and axially mounted and which forms part of an articulated connection between said two sections. Left and right-hand spool flanges 33 and 34 respectively are secured to the ends of the stationary section 30 with the aid of screws 34ᵃ to guide the tally strip as it is wound upon the core. At the right-hand end thereof the releasing rod 32 extends through the flange 34 and passes through a hub 35 firmly fixed to a cup-shaped housing member 36, and is received in a hub 37 attached to, or formed integrally with, the right-hand side plate 25. If desired, a washer 38 may be provided between the end of the hub 35 and the inner side of the side plate 25.

At its left-hand end, however, the releasing rod 32 extends through the flange 33 and is received in a boring or opening 40 provided in one end of a special shaft portion 41 which is fixed to a second cup-shaped housing member 42. Each of the cup-shaped housing members 36 and 42 and the hub connected therewith is operatively connected for rotative movement with the associated flanges 34 and 33 by means of a pin 43 secured in each flange and engaging in a slot 44 provided in each housing member, as shown in Figs. 4 and 5.

As explained in the Feiertag application above referred to the shaft portion 41 is received in a hub or friction member 45 which is provided with a bearing flange 46 at the right-hand end thereof inside the side plate 24. Said friction member 45 is, in turn, received or journaled in a hub 47 provided in the side plate 24. A gear 48 is loosely mounted on the shaft portion 41 and, as shown in Fig. 2, receives a driving movement from the feeding mechanism 26. However, in order to prevent any mutilation of the tally strip T or too great a feed thereof, and to insure the amount of feed of the tally strip being governed by the feeding mechanism 26 at all times, there is provided an automatically controlled frictional connection between the driven gear 48 and the rewind spool 27, as will presently appear.

As shown in Fig. 4 the shaft portion 41 projects to the left beyond the extremities of the hubs 45 and 47 and has secured at the end thereof a hollow cap or housing member 50. This member 50 is secured to the shaft portion 41 by means of a headed screw 51 received in a tapped opening 52 in the end of the shaft portion 41. The cap 50 forms a housing for an expansion spring 53 which surrounds the shaft portion 41 and bears at one end against the hub 45 and its other end against the inside wall of the cap 50. The tension of the spring 53 should be such as to cause a frictional engagement between the gear 48, the frictional flange 46 of the hub 45 and the housing member 42, and thereby effect a rotation of the spool 27 when the feed roll mechanism 26 is rotated. However, the frictional engagement of the gear 48 is such that as the tension in the tally strip increases due to the increase in the diameter of the spool with the winding of the tally strip thereon, parts of the frictional driving connection between said gear and the spool will slip one on another before the strip can be drawn by the rewind spool from between the feed rollers or torn.

Having thus described the general construction of the rewind spool 27 and how said spool is automatically driven from the feed roll mechanism 26, I shall now describe my novel clamping device and how the movable section 31 of the core is moved to open and clamping position by means of the releasing rod 32.

Referring to Figs. 4 and 6, it will be seen that, at its right-hand end the upper movable core section 31 is provided with an extension or arm 55 which extends through an opening or slot 56 in the flange 34 and into the inside of the cupped-housing member 36. The arm 55 is narrower than the section 31 and thus forms shoulders 55ᵃ on said section which bear against the flange 34 and thus prevent longitudinal movement to the right of the movable section 31. Pivoted to each side of the extension or arm 55 and near the end thereof by means of a pivot pin 57 is a link 58. In the normal position these links 58 are sloping or inclined and extend downwardly and to the right and are pivoted at their opposite ends by means of pivot pins 59 to an adjustable block 60. The block 60 is slidably mounted on the releasing rod 32 and held in its adjusted position adjacent the inner wall of the cupped-housing member 36 by means of a set-screw 61. Springs 62, each attached at one end to the pivot pin 57 and at its other end to a pin 63 provided on the inside of the cupped-housing member 36, tend to hold the right-hand end of the movable section 31 of the core of the spool 27 in the clamping engagement with the section 30, as shown in Fig. 4.

Similarly the opposite or left-hand end of the movable section 31 is provided with an extension or arm 64 which passes through an opening 65 provided in the flange 33 and into the inside of the cup-shaped housing member 42 to a point adjacent the left-hand wall thereof. This arm 64 is also narrower than the movable section 31 and forms shoulders 64ᵃ on said section which bear against the flange 33 and prevent leftward longitudinal movement of the section 31. A link 66 is pivoted by means of a pin 67 to each side of the arm 64 and in the normal position extends downwardly and to the right, as do the links 58, where it is pivoted by means of a pin 68 to a second block 69. The block 69, like the block 60, is mounted for adjustment on and along the releasing rod 32 and held in its adjusted position adjacent the flange 33 by means of a set-screw 70. The left-hand end of the movable section 31 is held in engagement with the stationary section 30 by means of springs 71 secured at one end to the pins 67 and at their other ends being attached to pins 72 provided in the cupped-housing member 42.

From an inspection of Fig. 4, it will be apparent that if the actuating rod 32 is moved to the left by applying pressure to a finger piece 74 secured to the right-hand end of said rod, the opposite end of said rod will slide into the boring 40. Since the blocks 69 and 60 are secured to the actuating rod 32 said blocks will also move to the left. This will result in moving the inner ends of the parallel links 58, 66 from the Fig. 4 to the Fig. 5 position, thereby forcing the movable section 31 outwardly or vertically upward to the releasing position shown in Fig. 5. Such movement is brought about against the tension of the springs 62 and 71 which in the Fig. 5 position exert their force lengthwise of the lengths of the links while they are dead centered, thereby holding the movable section in open position. Upon pulling out the finger piece 74 the parallel links will be shifted from their dead centered positions and the springs 62 and 71 will again be effective to move the section 31 to clamping position shown in Fig. 4. Aside from the fact that the four parallel spreader links form a sturdy construction and support for the movement of the movable section 31, said section is guided in its opening and clamping movement further by the slots 65 and 56 provided in the flanges 33 and 34 through which the arms 55 and 64 extend. It will be observed, moreover, from Fig. 6 that the shoulders 64ᵃ which bear against the flange 33 constitute means for preventing a movement of the section 31 with the releasing rod 32 when the latter is pushed to the left into releasing position. This compels the section 31 to receive a direct outward movement when moving to releasing position. Likewise the shoulders 55ᵃ prevent the section 31 from moving to the right when the releasing rod 32 is pulled out to allow the parts to return to clamping position.

From an inspection of Fig. 8 it will also be observed that the clamping face 31ᵃ of the movable section 31 in its movement into and out of clamping engagement with the clamping face 30ᵃ of the fixed section 30 is in parallelism therewith, and that the clamping faces 30ᵃ and 31ᵃ are of considerable breadth and effectively hold the tally strip between them without liability of tearing said strip. It will be seen, moreover, that the curved face of the movable section 31 coincides with and forms a continuation of the section 30 when the parts are in clamping position. This provides a smooth core on which the tally strip may be effectively wound.

It will therefore be apparent that when pressure is applied to the finger piece 74 to move it to the dotted line position shown in Fig. 3 the movable portion 31 of the rewind spool 27 will be raised from a clamping position, as shown in Fig. 4, to an open position, as shown in Fig. 5 and that the parts will be retained in such position as above described. When in the open position the end of a tally strip T may be inserted between the clamping faces of the sections 30 and 31 as illustrated in Fig. 8. The finger piece 74 may then be pulled out allowing the parts to return to their normal clamping or closed position under the tension of the springs 71 and 62. This will clamp the tally strip T between the two sections of the core of the rewind spool so that as said spool is rotated, due to the connections described above with the feed mechanism 26, said strip will be wound upon the rewind spool.

As shown in Fig. 3 the entire rewind spool 27 with its above described clamping mechanism presents a neat and pleasing appearance, the cup-shaped housing members 36 and 42 constituting enclosures for the operating parts of the clamping mechanism and thereby also aid in keeping this mechanism free from dust and dirt and preventing damage to the parts during the ordinary operation of the machine.

From the foregoing description it will be apparent that by my present invention I have provided a tally strip rewind spool having a cylindrical sectional core, one section of which is movable to open and clamping position by means of two sets of parallel links under the action of a push-rod. It will also be apparent that said sectional core has a smooth and substantially uninterrupted cylindrical surface and is normally held in clamping position by means of springs so that a tissue or other tally strip may be effectively clamped thereto.

Various changes may be made in the construction and certain features thereof may be employed without others without departing from my invention as it is defined in the accompanying claims.

What I claim as new and desire to secure by Letters Patent is:

1. A tally strip rewind spool for winding a printed tally strip thereon comprising a sectional cylindrical core including a fixed section and a movable section normally in clamping engagement therewith and forming a smooth and substantially uninterrupted cylindrical surface when so engaged with said fixed section, an axial bore in said fixed section, a releasing rod slidably mounted in said axial bore and means connecting said rod with said movable section, the construction being such that when said rod is moved inwardly the movable section will be raised to an open position so that a tally strip may be inserted between the two sections.

2. A tally strip rewind spool for winding a printed tally strip thereon comprising a sectional cylindrical core including a fixed section and a movable section normally in clamping engagement therewith and forming a smooth and substantially uninterrupted cylindrical surface when so engaged with said fixed section, an axial bore in said fixed section, a releasing rod slidably mounted in said axial bore, and parallel links connecting said rod with said movable section so that when said rod is moved inwardly the movable section will be raised to an open position to allow the insertion of a tally strip between said two sections.

3. A tally strip rewind spool comprising a sectional core including a stationary section and a section movable into and out of clamping engagement therewith, and means for moving said movable section to its open position and leave an unobstructed space between the sections through which a tally strip may be threaded, the end of the tally strip being secured to the core when the sections are closed, said means comprising a releasing rod slidably mounted in said stationary section and means connecting said rod with said movable section.

4. A tally strip rewind spool comprising a sectional core including a fixed section and a section movable relatively thereto and into and out of clamping engagement therewith, a flange secured to each end of said fixed section and having a slot therein, extended arms at the ends of said movable section and passing through said slots, and means engaging said extended arms for raising said movable section to its open position, said slots guiding said movable section in its opening and clamping movements.

5. A tally strip rewind spool comprising a sectional core including a fixed section and a section movable relatively thereto into and out of clamping engagement therewith, a releasing rod slidably mounted in said fixed section, means for resiliently holding said movable section in its clamping position, and means acted upon by said releasing rod for raising said movable section to its open position against the force of said holding means.

6. A tally strip rewind spool comprising a sectional core including a fixed section and a section movable relatively thereto and into and out of clamping engagement therewith, an extended arm at each end of said movable section, a releasing rod slidably mounted in said fixed section, a pair of blocks secured to said rod one on either side of said fixed section, and normally sloping parallel links connecting the ends of said extended arms with said blocks, whereby said links will be moved to positions that extend at substantially right angles to said movable section and carry it to its open position when pressure is applied to the end of said releasing rod.

7. A tally strip rewind spool comprising a sectional core including a fixed section and a section movable relatively thereto and into and out of clamping engagement therewith, an extended arm at each end of said movable section, a flange secured to each end of said fixed section for guiding a tally strip as it is wound on said core and having a slot therein through which the associated extended arm extends to guide said movable section in its opening and clamping movements, a releasing rod slidably mounted in said fixed section, means connecting said rod with the ends of said extended arms so that when said rod is moved inwardly said movable section will be raised to its open position, and means for housing said connecting means.

8. A tally strip rewind spool for winding a printed tally strip thereon comprising a sectional core including a fixed section and a section movable into and out of clamping engagement therewith, an unobstructed space being left between said sections when the movable section is open and through which the end of a tally strip may be threaded, means for moving said movable section to its open position and for holding it in clamping engagement with the interposed tally strip when the movable section is closed, and means for guiding said movable section in its opening and clamping movements whereby said section will be moved transversely of the axis of the core and maintained in parallelism therewith during such movement.

9. A tally strip rewind spool for winding a printed tally strip thereon comprising a sectional core including a fixed section and a section movable into and out of clamping engagement therewith, a flange secured to each end of said fixed section and having a slot therein, arms at the ends of said movable section forming shoulders thereon and passing through said slots, and means engaging said extended arms for raising said movable section to its open position, said slots guiding said movable section in its opening and clamping movements, and said shoulders engaging with the companion flange and preventing accidental longitudinal displacement of said movable section.

10. A tally strip rewind spool for winding a printed tally strip thereon comprising a sectional core including a fixed section and a section movable into and out of clamping engagement therewith, a releasing rod slidably mounted in said fixed section, normally inclined parallel links connecting the ends of said movable section with said releasing rod, and springs for resiliently holding said movable section in clamping position, the construction and arrangement being such that when said releasing rod is pushed inwardly said links will be moved to substantially dead centered positions and carry said movable section to its open position, said springs exerting their force to hold the links in dead centered position until said releasing rod is pulled outward.

NORBERT A. JUNG.